United States Patent Office

2,809,213
Patented Oct. 8, 1957

2,809,213

PROCESS FOR PREPARING CALCIUM PANTOTHENATE

Robert D. Lekberg, Worth, and Robert F. Hornbeck, Merrionette Park, Ill., assignors to Chemlek Laboratories, Inc., a corporation of Illinois No Drawing. Application December 29, 1954, Serial No. 478,494

9 Claims. (Cl. 260—534)

This invention relates to a new and novel process for the preparation of calcium salts of pantothenic acid. More in particular, the invention relates to an improved method for preparing calcium pantothenate where the required reactions are carried out under anhydrous conditions and none of the reactions involve the formation of water.

Pantothenic acid is not stable enough as a free acid to be generally used in commercial preparations, but its salts are quite stable. Known methods for preparing the salts of pantothenic acid involve coupling, through what is generally referred to as a peptide linkage, beta-alanine and alpha-hydroxy-beta, beta-dimethyl-gamma-butyrolactone. One method is to react the lactone with a metal salt of beta-alanine. This method has an inherent disadvantage in that the salts of beta-alanine are strongly basic and tend to react with the lactone to form salts of alpha, gamma-dihydroxy-beta, beta-dimethyl-butyric acid. Such salts are in the nature of impurities that are difficult to remove from the end product particularly in the case of racemic calcium pantothenate which is extremely difficult to crystallize as compared with the corresponding dextro-rotatory and levo-rotatory optical isomers. A second known method is to react beta-alanine with an amide derivative of alpha-hydroxy-beta, beta-dimethyl-gamma-butyrolactone. This second method requires an additional and costly step of initially converting the lactone to an amide with either ammonia or a primary amine. Still a third known method is to react alpha-hydroxy-beta, beta-dimethyl-gamma-butyrolactone with beta-alanine in the presence of an anhydrous alcoholic solution of a secondary or tertiary amine. The resulting product is then converted to the calcium salt of pantothenic acid by reacting with calcium oxide, resulting in the formation of one equivalent of water. One difficulty with this third method is that the formation of one equivalent of water in the final reaction contaminates the recovered alcohol and amine. Thus, to again use the recovered alcohol and amine they must first be rendered anhydrous by a difficult and costly treatment to remove the contaminating water. Another difficulty encountered is that water remaining with the residue from the above separation of alcohols and amines interferes with the obtaining of a dry end product.

From the foregoing it will be noted that all of the known methods have the same general purpose of directing the active groups of the lactone and of the beta-alanine in such a manner as to form the generally referred to peptide linkage between the carbonyl-carbon atom of the lactone and the amino-nitrogen atom of the beta-alanine.

It is therefore the principal object of the invention to provide an improved method for the preparation of calcium pantothenate by a unitary process whereby beta-alanine is first coupled through a peptide linkage with alpha-hydroxy-beta, beta-dimethyl-gamma-butyrolactone in the presence of an anhydrous alcohol and an amine and subsequently converting the product thereof to calcium pantothenate such that the alcohol and amine are recovered directly from the reaction mass free from water.

Another object of this invention is to provide an improved method for the preparation of biologically active racemic calcium pantothenate by a unitary process whereby beta-alanine is first coupled through a peptide linkage with optically inactive alpha-hydroxy-beta, beta-dimethyl-gamma-butyrolactone in the presence of an anhydrous alcohol, and an amine and subsequently converting the product thereof to biologically active racemic calcium pantothenate such that the alcohol and amine are recovered directly from the reaction mass free from water.

A further object of this invention is to provide an improved method for the preparation of biologically active dextro-rotatory calcium pantothenate by a unitary process whereby beta-alanine is first coupled through a peptide linkage with levo-rotatory alpha-hydroxy-beta, beta-dimethyl-gamma-butyrolactone in the presence of an anhydrous alcohol and an amine and subsequently converting the product thereof to biologically active dextro-rotatory calcium pantothenate such that the alcohol and amine are recovered from the reaction mass free from water.

These and other objects and advantages of the invention will become apparent from the following description of preferred embodiments and the appended claims.

The presence of an asymmetric carbon atom in pantothenic acid explains the fact that in the stable salts thereof there exists two optically active forms, one dextro-rotatory and the other levo-rotatory. The dextro-rotatory form is the most important of these two forms because it is biologically active while the levo-rotatory form is to the contrary, biologically inactive. In addition there exists a third or racemic form which is optically inactive but biologically active to the extent of approximately one-half that of the corresponding dextro-rotatory form.

While the dextro-rotatory form of calcium pantothenate has a biological potency equivalent to approximately twice the same amount of racemic calcium pantothenate, nevertheless the cost of preparation per unit weight of biologically active mass is far greater for the dextro-rotatory form as compared with the racemic form. This is due to the fact that it is necessary to use the relatively expensive levo-rotatory alpha-hydroxy-beta, beta-dimethyl-gamma-butyrolactone in the preparation of dextro-rotatory pantothenic acid salts which lactone is obtained by preparing derivatives of the synthetically produced racemic form of the lactone with an optically active base such as an alkaloid, and resolving the optically active isomers therefrom.

We have discovered a new and novel two-stage unit process for preparing calcium pantothenate which is adapted for use in preparing either an optically active form of the salt or its corresponding optically inactive racemic form. Broadly stated the first stage consists of mixing substantially stoichiometric quantities of alpha-hydroxy-beta, beta-dimethyl-gamma-butyrolacetone and beta-alanine and an amount of a secondary or tertiary amine slightly in excess of a stoichiometric equivalent in an anhydrous alcohol and reacting the mixture until the reaction is complete as evidenced by the dissolution of the beta-alanine. The second stage consists of adding substantially a stoichiometric quantity of metallic calcium particles (½″ particles or finer) and reacting the mixture until the calcium is dissolved. The anhydrous alcohol and the secondary or tertiary amine are recovered by distillation leaving the product, calcium pantothenate, as a residue. If, in the first stage, the levo-rotatory isomer of the lactone is used, the product at the end of the second stage is dextro-rotatory calcium pantothenate, which may be crystallized out readily by usual methods instead of obtaining the product as a residue from distillation. However, if in the first stage the racemic form of the lactone is used, the resulting product at the end of the second stage is racemic calcium pantothenate which is exceedingly difficult to crystallize out by usual methods. Even under the best conditions generally known it required five weeks or more to reach approximately 70% completion of crystallization of the racemic salt.

By way of illustration the following specific examples of the invention are described.

*Example 1*

Into a vessel equipped with an agitator and reflux condenser are placed approximately 52 parts by weight of optically inactive racemic alpha-hydroxy-beta, beta-dimethyl-gamma-butyrolactone, approximately 36 parts by weight of beta-alanine, about 40 parts by weight of diethylamine and about 100 parts by weight of anhydrous methanol. The mixture is stirred and refluxed for about 12 hours until the reaction is complete as evidenced by the dissolution of the beta-alanine. To this resulting mass is gradually added 8 parts by weight of calcium metal nodules or pellets and refluxing continued until the metal is dissolved. The diethylamine and alcohol are distilled off until the residue becomes viscous. The viscous residue is dried under vacuum at 100° C. The solid residue recovered, as biologically assayed, indicated a 91% theoretical yield of racemic calcium pantothenate.

*Example 2*

Into a vessel equipped with an agitator and reflux condenser are placed approximately 52 parts by weight of optically active levo-rotatory alpha-hydroxy-beta, beta-dimethyl-gamma-butyrolacetone, approximately 36 parts by weight of beta-alanine, about 40 parts by weight of diethylamine and about 100 parts by weight of anhydrous methanol. The mixture is stirred and refluxed for about 12 hours until the reaction is complete as evidenced by the dissolution of the beta-alanine. To this resulting mass is gradually added approximately 8 parts by weight of calcium metal nodules or pellets and refluxing continued until the metal is dissolved. To this mass is then added about 50 parts by weight of anhydrous methanol and the solution boiled until crystalline precipitation is complete. The mass is cooled, filtered and the crystals are washed with cold anhydrous methanol. The crystalline product recovered, as biologically assayed, indicated a 93% theoretical yield of dextro-rotatory calcium pantothenate. Levo-rotatory calcium pantothenate may be prepared in the same way except that the dextro-rotatory lactone isomer is used in the first stage instead of the levo-rotatory isomer.

We now consider some of the theoretical aspects concerning the mechanisms of the involved reactions. First of all it appears that either a secondary or a tertiary amine must be used in the first stage with the lactone and beta-alanine. A primary amine is unsuitable as it tends to break the lactone linkage forming an amide with the carbonyl carbon atom of the lactone, which amide is difficult to couple with beta-alanine in a peptide linkage. Secondary and tertiary amines although stronger bases than primary amines do not easily form amide derivatives with the lactone presumably because of steric hinderance of the substituted organic groups around the amine nitrogen atom. We have in practice found that the lower aliphatic secondary and tertiary amines are more suitable for employing in our process than other amines. For example, diethylamine and triethylamine are satisfactory.

It has been indicated that the reaction occurring in the first stage of the process is a third order type reaction resulting from the simultaneous collision of one molecule of each of the reacting components. This is refuted by the fact that if the anhydrous alcohol is substituted with a non-polar solvent like chloroform (or a similar amount of diethylamine) the reaction does not proceed. Furthermore, if a secondary alcohol (anhydrous) is substituted for the primary alcohol (anhydrous methanol), the reaction proceeds but at a reduced rate. Likewise if a tertiary alcohol (anhydrous) is substituted for the methanol the reaction proceeds at a rate slower than that when a secondary alcohol is used. Thus the anhydrous lower aliphatic primary alcohols are more suitable as the yield of the product is almost theoretical and the reactions proceed at a faster rate. These facts strongly suggest that the functional portion of the alcohol enters into the reaction probably forming an unstable intermediate compound which promptly reacts with another component. The degree of activity of the hydroxyl group of the solvent alcohol apparently plays an important role in the rate at which the reactions in the first stage proceed. It is our opinion that the activity of the hydroxyl group of the solvent alcohol disrupts the lactone linkage probably to form an addition compound with the carbonyl group of the lactone at a very low equilibrium concentration, thus giving, in the case of the above two examples, the possibility of a small amount of the methyl ester of alpha, gamma-dihydroxy-beta, beta-dimethyl-butyric acid in the reaction mixture. Such a reaction is not too improbable for it is known that water will disrupt a lactone linkage to form an equilibrium concentration of the corresponding acid and we found that the first stage reactions could be made to proceed where the reaction mass consisted only of diethylamine, lactone and beta-alanine, by adding a small amount of water to the mixture. The resulting yield was only 70% of theoretical yield and where a larger amount of water was added the resulting yield was still lower, indicating that the presence of water introduced side reactions which prevented quantitative coupling of the lactone and beta-alanine.

While the above discussed intermediate formation of the addition compound resulting from the conversion of the lactone is taking place, we think that simultaneously the diethylamine reacts with the carboxyl group of the beta-alanine to activate the amine end of the molecule, thus presenting the necessary conditions which promote the formation of the peptide linkage.

The formation of this linkage, we think, upsets the equilibrium concentrations of both the intermediate addition compound and the amine activated beta-alanine which allows the reaction of the first stage to proceed to completion. Since we have stated that the first stage reaction will proceed with varying rates in the presence of secondary and tertiary alcohols, it seems that the relative activity of the hydroxyl group of the alcohol used has a profound effect on the rate of reaction throughout this stage.

The second stage of our novel process is where an important feature of our invention resides. It has been stated previously that the presence of water in the first stage reactions is highly detrimental. The second stage involves the displacement of the secondary or tertiary amine from the quaternary amine salt of pantothenic acid with calcium to form calcium pantothenate. Previously this displacement was accomplished by adding calcium oxide. This method of displacement resulted in the formation of one equivalent of water for each stoichiometric equivalent of calcium pantothenate formed which not only reduced the yield of calcium pantothenate but more importantly it contaminated the solvents. Thus the recovered solvents from the reaction mass must be subjected to a costly dehydrating process to render them anhydrous for subsequent use in the first stage reaction. Our process dispenses with this difficulty for we found that if metallic calcium is used instead of calcium oxide no water is formed and the alcohol along with the displaced secondary (or tertiary) amine is easily recovered from the reaction mass at the end of the second stage in an anhydrous condition by simple distillation.

We have stated that when racemic calcium pantothenate is prepared by our process, it is exceedingly difficult to crystallize in paramount contrast to the ease with which either of the optical isomers crystallize when prepared by the same process. The anomalous behavior of the racemic calcium pantothenate with respect to crystallization indicates that it is a true racemic compound and not a mixture of equal amounts of the two optically active isomers.

Since there are two pantothenic acid groups associated with each atom of calcium there are three distinct possibilities of distribution in a given mass of calcium pantothenate which displays neutral optical activity. One possibility is that there are two pantothenic acid groups of the same optically active isomer associated with each calcium atom. Thus for each molecule of calcium pantothenate having both acid groups of the dextro-rotatory isomer associated with its respective calcium atom, there would also be one molecule of calcium pantothenate having both acid groups of the levo-rotatory isomer. This would be equivalent to a mechanical mixture of the two optically active isomers and would usually be expected to display properties of crystallization characteristic of the two. Another possibility is that of a random distribution in which one fourth of the molecules have two isomeric dextro-groups associated with a calcium atom, one-fourth of the molecules have two isomeric levo-groups associated with a calcium atom, and one-half of the molecules each having one isomeric dextro-group and one isomeric levo-group associated with a calcium atom, the latter one-half of the molecules being internally compensated with respect to optical activity. In this case, one-half of the mixture would correspond to a mixture of optical isomers and the remaining one-half a true racemic compound. From a mixture such as this it is not unreasonable to expect that some of the optical isomers would crystallize in a manner similar to optically active isomers alone.

The fact that a solution of racemic calcium pantothenate will not crystallize under those conditions which readily promote the crystallization of the optically active isomers indicates strongly that a third possibility is most likely. This would simply be a uniform distribution of molecules of calcium pantothenate each having one isomeric dextro-rotatory group of the acid and one isomeric levo-rotatory group of the acid associated with a calcium atom, resulting in a single compound which is completely internally compensated or, in other words, true racemic calcium pantothenate. Further experiments in crystallization seem to support this hypothesis.

For example, calcium pantothenate was prepared in which a ratio of three parts by weight of levo-rotatory lactone to one part by weight of dextro-rotatory lactone was used in the first stage reaction. Thus the product at the end of the second stage reaction might be expected to contain a ratio of three parts dextro-rotatory calcium pantothenate to one part of levo-rotatory calcium pantothenate. However, only one-half of the calcium pantothenate thus formed crystallized out of the methanol solution which crystals biologically assayed 93% dextrorotatory calcium pantothenate. The remaining calcium pantothenate in the reaction mass did not crystallize and exhibited properties typical of uncrystallized racemic calcium pantothenate, being extremely hygroscopic and very soluble in anhydrous methanol. Thus it appears that racemic calcium pantothenate is more stable than either of the optically active isomers and tends to form, probably through intermolecular rearrangement of equal quantities of each of the optically active isomers.

It is also known that other derivatives of the lactone display characteristics of racemic compounds. As an example alpha, gamma-dihydroxy-beta, beta-dimethylbutyramide exists in levo-rotatory form and dextro-rotatory form, both melting at 94° C., while the racemic form melts at 126–127° C. This clearly indicates that it exists as a true racemic compound. In view of this it is not surprising that the structure of calcium pantothenate would also exhibit a tendency to form a true racemic compound.

While specific examples of the invention are disclosed herein, the invention is not limited solely thereto as the precise proportions of the materials utilized may be varied and other members of this class of compounds may be employed without departing from the spirit and scope of the invention as defined in the appended claims.

We claim:

1. A process for the preparation of calcium pantothenate consisting of the steps of heating and refluxing substantially stoichiometric quantities of beta-alanine and alpha-hydroxy-beta, beta-dimethyl-gamma-butyrolactone in an anhydrous lower aliphatic alcohol in the presence of at least a stoichiometric quantity of an amine selected from the group consisting of secondary and teritary amines until all the reactants are in solution, adding to the reaction mass obtained therefrom substantially a stoichiometric quantity of calcium metal and continuing the refluxing of the resulting mixture until said metal is dissolved, removing the anhydrous lower aliphatic alcohol and said amine therefrom and drying the resulting product of calcium pantothenate.

2. A process for the preparation of calcium pantothenate consisting of the steps of heating and refluxing substantially stoichoimetric quantities of beta-alanine and alpha-hydroxy-beta, beta-dimethyl-gamma-butyrolactone in anhydrous lower aliphatic primary alcohol in the presence of at least a stoichiometric quantity of an amine selected from the group consisting of secondary and tertiary amines until all the reactants are in solution, adding to the reaction mass obtained therefrom substantially a stoichiometric quantity of calcium metal and continuing the refluxing of the resulting mixture until said metal is dissolved, removing the anhydrous lower aliphatic primary alcohol and said amine therefrom and drying the resulting product of calcium pantothenate.

3. A process for the preparation of calcium pantothenate consisting of the steps of heating and refluxing substantially stoichiometric quantities of beta-alanine and alpha-hydroxy-beta, beta-dimethyl-gamma-butyrolactone in anhydrous methanol in the presence of at least a stoichiometric quantity of an amine selected from the group consisting of secondary and tertiary amines until all the reactants are in solution, adding to the reaction mass obtained therefrom substantially a stoichiometric quantity of calcium metal and continuing the refluxing of the resulting mixture until said metal is dissolved, removing the anhydrous methanol and said amine therefrom and drying the resulting product of calcium pantothenate.

4. A process for the preparation of racemic calcium pantothenate consisting of the steps of heating and refluxing substantially stoichiometric quantities of beta-alanine and racemic alpha-hydroxy-beta, beta-dimethyl-gamma-butyrolactone in an anhydrous lower aliphatic alcohol in the presence of at least a stoichiometric quantity of an amine selected from the group consisting of secondary and tertiary amines until all the reactants are in solution, adding to the reaction mass obtained therefrom substantially a stoichiometric quantity of calcium metal and continuing the refluxing of the resulting mixture until said metal is dissolved, removing by distillation the anhydrous lower aliphatic alcohol and said amine therefrom and drying the resulting product of racemic calcium pantothenate.

5. A process for the preparation of racemic calcium pantothenate consisting of the steps of heating and refluxing substantially stoichiometric quantities of beta-alanine and racemic alpha-hydroxy-beta, beta-dimethyl-gamma-butyrolactone in anhydrous methanol in the presence of at least a stoichiometric quantity of an amine selected from the group consisting of secondary and tertiary amines until all the reactants are in solution, adding to the reaction mass obtained therefrom substantially a stoichiometric quantity of calcium metal and continuing the refluxing of the resulting mixture until said metal is dissolved, removing by distillation the anhydrous methanol and said amine therefrom and drying the resulting product of racemic calcium pantothenate.

6. A process for the preparation of dextro-rotatory calcium pantothenate consisting of the steps of heating and refluxing substantially stoichiometric quantities of beta-alanine and levo-rotatory alpha-hydroxy-beta, beta-dimethyl-gamma-butyrolactone in an anhydrous lower aliphatic alcohol in the presence of at least a stoichiometric quantity of an amine selected from the group consisting of secondary and tertiary amines until all the reactants are in solution, adding to the reaction mass obtained therefrom substantially a stoichiometric quantity of calcium metal and continuing the refluxing of the resulting mixture until said metal is dissolved, and permitting the solution to stand to precipitate dextro-rotatory calcium pantothenate therefrom, removing the anhydrous lower aliphatic alcohol and said amine by filtration and drying the resulting product of dextro-rotatory calcium pantothenate.

7. A process for the preparation of dextro-rotatory calcium pantothenate consisting of heating and refluxing substantially stoichiometric quantities of beta-alanine and levo-rotatory alpha-hydroxy-beta, beta-dimethyl-gamma-butyrolactone in anhydrous methanol in the presence of at least a stoichiometric quantity of an amine selected from the group consisting of secondary and tertiary amines until all the reactants are in solution, adding to the reaction mass obtained therefrom substantially a stoichiometric quantity of calcium metal and continuing the refluxing of the resulting mixture until the metal is dissolved, and permitting the solution to stand to precipitate dextro-rotatory calcium pantothenate therefrom, removing the anhydrous methanol and said amine by filtration and drying the resulting product of dextro-rotatory calcium pantothenate.

8. A process for the preparation of dextro-rotatory calcium pantothenate consisting of the steps of heating and refluxing substantially stoichiometric quantities of beta-alanine and levo-rotatory alpha-hydroxy-beta, beta-dimethyl-gamma-butyrolactone in anhydrous methanol in the presence of at least a stoichiometric quantity of diethylamine until all the reactants are in solution, adding to the reaction mass obtained therefrom substantially a stoichiometric quantity of calcium metal and continuing the refluxing of the resulting mixture until the metal is dissolved, removing the anhydrous methanol and diethylamine and drying the resulting product of dextro-rotatory calcium pantothenate.

9. A process for the preparation of racemic calcium pantothenate consisting of the steps of heating and refluxing substantially stoichiometric quantities of beta-alanine and racemic alpha-hydroxy-beta, beta-dimethyl-gamma-butyrolactone in anhydrous methanol in the presence of at least a stoichiometric quantity of diethylamine until all the reactants are in solution, adding to the reaction mass obtained therefrom substantially a stoichiometric quantity of calcium metal and continuing the refluxing of the resulting mixture until said metal is dissolved, removing by distillation the anhydrous methanol and diethylamine therefrom and drying the resulting product of racemic calcium pantothenate.

References Cited in the file of this patent

UNITED STATES PATENTS

| | | |
|---|---|---|
| 2,234,680 | Moore | Mar. 11, 1941 |
| 2,418,902 | Rogers | Apr. 15, 1947 |
| 2,496,363 | Wilson et al. | Feb. 7, 1950 |

FOREIGN PATENTS

| | | |
|---|---|---|
| 561,877 | Great Britain | June 8, 1944 |